Oct. 27, 1970   H. F. MILLER   3,535,946

POSITIVE DRIVE BELT

Filed Jan. 5, 1968

INVENTOR.
HENRY F. MILLER
BY James R. Hulen
ATTORNEY

United States Patent Office 3,535,946
Patented Oct. 27, 1970

3,535,946
POSITIVE DRIVE BELT
Henry F. Miller, Clifton, N.J., assignor to Uniroyal, Inc.,
New York, N.Y., a corporation of New Jersey
Filed Jan. 5, 1968, Ser. No. 695,911
Int. Cl. F16g *1/12, 1/22, 1/28*
U.S. Cl. 74—232                           3 Claims

ABSTRACT OF THE DISCLOSURE

An endless positive drive transmission belt having a substantially inextensible tensile member and elastomeric teeth bonded to at least one side of the tensile member, the teeth having reinforcing fibers embedded therein to increase the shear strength of the teeth.

BACKGROUND OF THE INVENTION

Field of the invention

This invention relates to endless positive drive transmission belts and, more particularly, the invention relates to an improved belt tooth construction that greatly increases the shear strength of the belt teeth.

Description of the prior art

U.S. Pat. No. 2,507,852 which isssued on May 16, 1950 to R. Y. Case, describes in detail a power transmission belt that has revolutionized the power transmission field. This belt comprises an inextensible tensile member having teeth bonded to one side thereof and a protective jacket fabric covering the teeth. The teeth are preferably made of an elastomeric material, such as rubber, and the belt may also include a backing layer identical, or similar to the material of which the teeth are constructed.

Many different elastomeric materials have been utilized for the construction of belts made in accordance with the above-cited patent, two of the more common materials being neoprene and polyurethane. The above described belt is designed to mesh with toothed pulleys that are constructed of material having a higher Young's modulus than the elastomeric material used for the construction of the belt. For this reason, the belt teeth are subjected to a very high shear stress and it has been found that the greatest belt failure occurs as a result of the complete shearing of the teeth from the remaining belt structure.

Different tooth and pulley configurations have been utilized to reduce or eliminate the amount of shear to which the belt teeth are subjected, however, this is still the most common problem that affects belt failure.

SUMMARY OF THE INVENTION

The present invention greatly reduces the deleterious effect previously experienced because of tooth shear. This is accomplished by altering the tooth construction by incorporating reinforcing means into the matrix of the relatively weaker elastomeric material. The reinforcing means is a fibrous, high-strength material. The elastomeric matrix in which the fibers are embedded serves to transmit the load from fiber to fiber by shear. Since the length/diameter ratio of the fiber reinforcing material is large, the shear load on the matrix is low and, consequently, the fiber becomes the highly loaded component of composite structure.

DESCRIPTION OF THE PREFERRED EMBODIMENT

Figure 1:
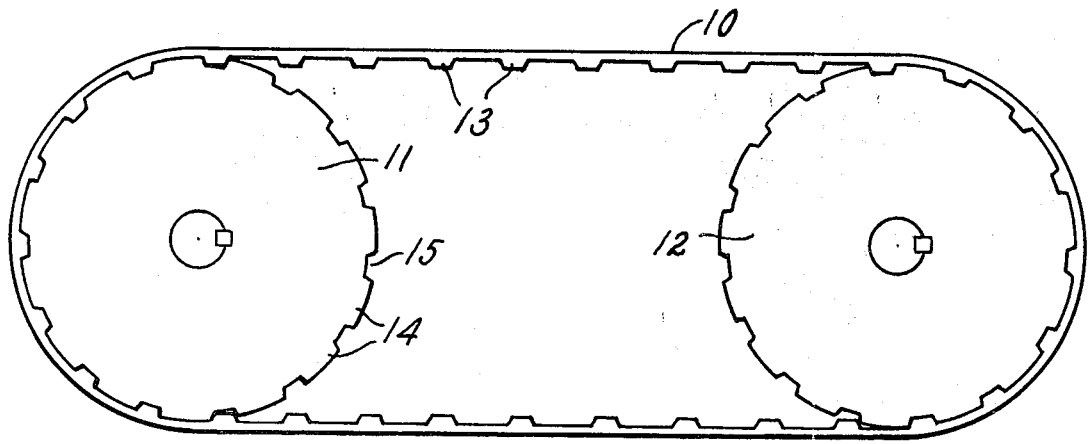
FIG. 1 is a side elevational view of the belt embodying this invention, and shown in engagement with its cooperating pulleys.
Figure 2:
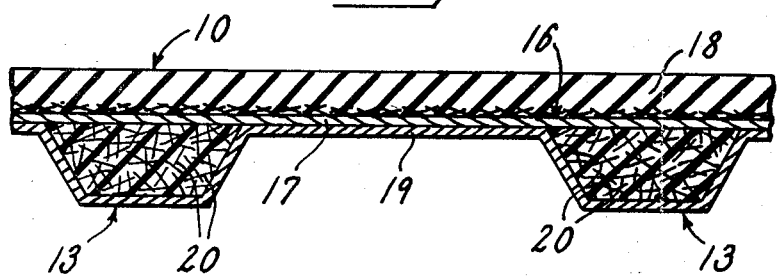
FIG. 2 is a fragmentary longitudinal cross-sectional view showing one embodiment of this invention.
Figure 3:
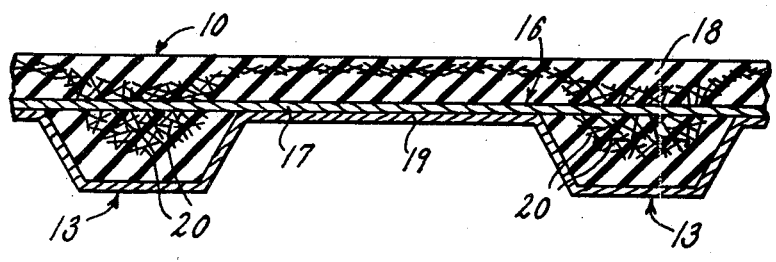
FIG. 3 is a fragmentary longitudinal section showing another embodiment of this invention.

The belt 10 embodying this invention is shown in FIG. 1 in engagement with driving and driven pulleys 11 and 12. The belt 10 is provided with teeth 13 which accurately mesh with the teeth 14 on the pulleys 11 and 12. That is, the teeth 13 fit accurately within the spaces 15 between the teeth 14 on the pulleys, or the width of the teeth 13 may be slightly less than the distance between the teeth 14 as desired. The belt 10 is endless, and as shown in FIGS. 2 and 3, it is provided with a strain-resisting member or tensile member 16 comprising a plurality of turns of a continuous strand 17, preferably of high tensile strength wire or glass. The strain-resisting tensile member 16 carries substantially the entire working load imposed upon the belt 10, and under the maximum load for which the belt is designed, the member 16 is substantially inextensible. The above-cited U.S. Pat. No. 2,507,852 may be consulted for a much more detailed description of the basic toothed belt and pulley system.

The improved belt construction is illustrated in FIG. 2 wherein a belt 10 is constructed with spaced teeth 13 and a backing layer 18. An inextensible tensile member 16 is embedded in the belt approximately at the dedenum line of teeth 13 and a protective jacket fabric 19 extends over the entire toothed surface of the belt.

Teeth 13 are shown reinforced with randomly oriented fibers 20. As stated above, the reinforcing fibers are utilized to greatly increase the strength of the relatively weaker elastomeric matrix material. It has been found that the major portion of the load is transmitted from fiber to fiber by shear and the elastomeric matrix plays only a minor role in absorbing the load created by the relatively strong pulley teeth.

The preferred fibers tested to date are brass-coated steel wires 0.125″ to 0.250″ in length and 0.006″ in diameter. It is desirable to have the length-diameter ratios of the fiber-reinforcing materials to be relatively large and, preferably, greater than 10/1.

Although the belt illustrated in FIG. 2 may be made in a number of ways, it is preferable to take advantage of the unique method described in U.S. Pat. No. 3,708,-206, which issued on Feb. 19, 1963 to W. A. Skura. The method described in the above-cited patent includes the manipulative steps of wrapping a jacket fabric, such as stretchable fabric 19 around a grooved mold; winding a tensile member over the jacket; wrapping a layer of neoprene rubber over the tensile member; and then forcing a portion of the backing layer through the tensile member into the grooves of the mold to form the belt teeth. In this operation the jacket fabric is stretched by the mold rubber and conforms to the contour of the grooved mold. This method may be modified in accordance with the present invention by loading the neoprene stock with the reinforcing fibers prior to the application of heat and pressure to the backing layer to thereby embed the fibers into the finished belt teeth. It has been found that the fibers flow through the tensile member and fill either the entire tooth cavity or a portion of the tooth cavity depending upon the location of the loaded neoprene prior to molding.

Referring to the FIG. 2 embodiment, the fibers 20 are shown substantially filling the tooth portion 13 and also lying along the tensile member 16 in the area between the teeth. In this embodiment, the loaded neoprene was located along the lower surface which was in contact with the tensile member prior to molding. The fibers were forced by the pressure of molding into the entire tooth cavity.

In the FIG. 3 embodiment, wherein like numerals are utilized to designate the elements that are described in FIG. 2, the fibers 20 are shown only partially distributed within the belt teeth 13. This construction is obtained by locating the loaded neoprene in an area spaced from tensile member 16 so that the molding pressure forces the fibers only partially into the tooth cavities. In this embodiment, the fibers located in the space between teeth 13 are spaced from the tensile member 16 near the back portion of belt 10. Hence, by selecting the location of the loaded neoprene stock, the fibers can be made to flow into the regions of the tooth where the reinforcement is desired.

The method of loading the neoprene backing layer is not critical and it has been found that the fibers can be either randomly or preferentially oriented. If the directions of the principal strains are known, an efficient use of fibers would be to orient them along the maximum and/or minimum principal strain axes. If the directions of the principal strains are unknown, a random distribution of fibers would be preferable. This requires the use of more fibers to achieve the same shear strength, since not all of the fibers will be located in the preferred directions.

The percentage of fibers embedded in the tooth determines the resultant shear strength of the tooth. As the percentage of fibers increases, the modulus and shear strength increases. It should be noted that there is a "critical" volume of fibers below which the matrix is actually weakened by the presence of the fibers. For fiber volumes above the critical, the matrix is strengthened by the presence of the fibers. The critical volume is defined in an article entitled "Whisker-Strengthened Materials," by Richard Krock, International Science and Technology, November 1966. Based on the physical properties of steel and elastomers in general, the critical volume of the combination is very small (i.e., somewhere in the neighborhood of 0.5 to 1 percent). Thus, for the steel-reinforced elastomers, almost any addition of fibers will result in increased shear strength.

By way of example, excellent results were obtained when the above-described steel fibers which have a length of 0.250" and a diameter of 0.006" were oriented parallel to the tensile member and added in an amount of 10% of the tooth weight. The above belt was tested and proved to have a much higher load-carrying capacity than a similar belt made without fiber reinforcement.

The procedure used for the above test was to conduct a photoelastic study of the strain fields developed in a reinforced and unreinforced tooth under the same loading conditions using a photoelastic coating technique. The results of this study indicate that the photoelastic fringe order, and hence the maximum shear strain level, developed in the reinforced tooth is approximately ⅓ that developed in the unreinforced tooth. The highest fringe order developed in the unreinforced tooth is 12, while that developed by the reinforced tooth is only 4. Hence, the maximum shear strain developed in the reinforced tooth was ⅓ of that developed in the unreinforced tooth. Thus, the fiber-reinforced tooth was proven to have three times the load-carrying capacity of the unreinforced tooth.

As a second example, excellent results were also obtained when the above described steel fibers which have a length of 0.25" and a diameter of .006" were oriented parallel to the tensile member and added in an amount of 20 percent of the tooth weight. The above belt was tested using the photoelastic technique mentioned above. It was found that the maximum shear strain developed in the reinforced tooth was $\frac{1}{3.5}$ to ¼ of that developed in the unreinforced tooth. Thus, the fiber-reinforced tooth was proven to have 3.5 to 4 times the load-carrying capacity of the unreinforced tooth.

Although brass-coated steel wire has been described as the preferred reinforcing fiber, other metallic whisker materials such as aluminum oxide, carbon, silicon carbide, and others may be used with this invention. In addition to the metallic fibers, other reinforcing materials, such as nylon, asbestos, glass, rayon and cotton may be used to provide a reinforcement for the elastomeric matrix. The essential characteristics for the reinforcing fibers usable with the subject invention are that they have a relatively high modulus and tensile strength with respect to the elastomeric matrix in which they are embedded. The fibers must also be capable of forming a strong bond with the elastomeric material.

It will be apparent from the above description that a unique toothed belt construction is provided which will greatly increase the life of a belt by decreasing belt failure caused by tooth shear. This vast improvement is accomplished in a relatively simple manner by merely loading the tooth stock material with a plurality of reinforcing fibers prior to the molding of the teeth in a conventional manner. The shear load on the matrix is greatly reduced and the total tooth load is transmitted to the tensile member from fiber to fiber.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true scope and spirit of the invention.

Having thus described my invention, what I claim and desire to protect by Letters Patent is:

1. A positive drive transmission belt comprising: a substantially inextensible tensile member; elastomeric teeth bonded to at least one side of said tensile member; a backing layer of elastomeric material on said tensile member; and reinforcing fibers distributed throughout said backing layer and extending through said tensile member into the elastomeric material of said teeth.

2. The transmission belt of claim 1 wherein said reinforcing fibers are distributed in said backing layer in an area surrounding said tensile member.

3. The transmission belt of claim 1 wherein said reinforcing fibers are distributed in said backing layer in an area remote from said tensile member and extend through said tensile member only partially into the volume of said teeth.

References Cited

UNITED STATES PATENTS 3,078,206   2/1963   Skura _____ 74—231 XR
3,404,578  10/1968   Koch et al. _____ 74—231

JAMES A. WONG, Primary Examiner

U.S. Cl. X.R.

74—237